United States Patent
Emerson et al.

(10) Patent No.: US 8,482,151 B2
(45) Date of Patent: Jul. 9, 2013

(54) AUXILIARY POWER SYSTEMS AND METHODS THEREOF

(75) Inventors: Marcus C. Emerson, Alfred Station, NY (US); Stuart M. Fielding, Alpharetta, GA (US); Anthony J. Mormino, Alfred, NY (US); Richard L. Puffer, Hornell, NY (US); Keith D. H. Blackburn, Nunda, NY (US)

(73) Assignee: Electrical Power worX Corp., Alfred, NY (US)

( * ) Notice: Subject to any disclaimer, the term of this patent is extended or adjusted under 35 U.S.C. 154(b) by 228 days.

(21) Appl. No.: 12/828,885

(22) Filed: Jul. 1, 2010

(65) Prior Publication Data

US 2011/0001353 A1 Jan. 6, 2011

Related U.S. Application Data

(60) Provisional application No. 61/270,075, filed on Jul. 2, 2009.

(51) Int. Cl.
*B60L 1/00* (2006.01)
(52) U.S. Cl.
USPC ........................................................ 307/9.1
(58) Field of Classification Search
USPC ........... 701/19, 22; 307/9.1; 29/592.1; 191/2; 320/101
See application file for complete search history.

(56) References Cited

U.S. PATENT DOCUMENTS

| 4,259,713 | A | * | 3/1981 | Flisberg et al. | 363/35 |
| 5,898,282 | A | | 4/1999 | Drozdz et al. | |
| 6,281,598 | B1 | | 8/2001 | King et al. | |
| 6,407,465 | B1 | | 6/2002 | Peltz et al. | |
| 7,671,565 | B2 | * | 3/2010 | Straubel et al. | 320/134 |
| 2005/0139399 | A1 | | 6/2005 | Gopal | |
| 2006/0005738 | A1 | | 1/2006 | Kumar | |
| 2006/0005739 | A1 | * | 1/2006 | Kumar | 105/35 |
| 2006/0125319 | A1 | | 6/2006 | King et al. | |
| 2007/0002518 | A1 | * | 1/2007 | Wilk et al. | 361/272 |
| 2007/0258192 | A1 | | 11/2007 | Schindall et al. | |
| 2007/0272116 | A1 | | 11/2007 | Bartley et al. | |
| 2008/0021602 | A1 | | 1/2008 | Kingham et al. | |
| 2008/0276824 | A1 | * | 11/2008 | King et al. | 105/50 |
| 2010/0147184 | A1 | * | 6/2010 | Kitanaka et al. | 105/61 |
| 2010/0161162 | A1 | * | 6/2010 | Kitanaka et al. | 701/22 |

* cited by examiner

*Primary Examiner* — Daniel Cavallari
(74) *Attorney, Agent, or Firm* — Joseph M. Noto; Bond Schoeneck & King PLLC

(57) ABSTRACT

An auxiliary power supply system includes a passive ultra-capacitor buffer module and an auxiliary power unit coupled to the passive ultra-capacitor. The auxiliary power unit is configured to receive a current supply from the passive ultra-capacitor buffer module. The auxiliary power unit is configured to power one or more auxiliary devices of a railcar over one or more gaps in a power rail. Also disclosed is an exemplary method of making an auxiliary power supply system.

20 Claims, 4 Drawing Sheets

AUXILIARY POWER SYSTEMS AND METHODS THEREOF

CROSS REFERENCE TO RELATED APPLICATIONS

This application claims the benefit of U.S. Provisional Application Ser. No. 61/270,075 filed Jul. 2, 2009, entitled "PASSIVE HIGH VOLTAGE ELECTROCHEMICAL DOUBLE LAYER CAPACITOR BUFFER MODULE FOR AN AUXILIARY POWER UNIT OF A RAILCAR," which is hereby incorporated by reference in its entirety.

FIELD OF THE INVENTION

The present invention generally relates to an auxiliary power supply system, and more particularly to a passive high voltage ultra-capacitor buffer module configured to supply current to an auxiliary power unit of a railcar and methods thereof.

BACKGROUND

Safety regulations and other design reasons, for example, isolation of power supply during an emergency passenger evacuation of a railcar, require intentional physical gaps to be introduced in an otherwise continuous stretch of a conducting power rail on a rail line. Conventional auxiliary power systems, for example those used on railcars, must disconnect and isolate from the power rail at these physical gaps to prevent the possibility of energizing an isolated section of power rail as they enter. This isolation may often occur for several seconds. These conventional auxiliary power systems contain insufficient energy storage to maintain their output while traversing the power supply gaps in the rail lines. The power supply gaps occur frequently during operation of a railcar resulting in shutdown and start-up of the auxiliary power system. The frequent shutdown and start-up causes wear and tear of the components of the auxiliary power system, and additionally, is a discomfort to passengers. For example, poor or no supply of power over the gaps causes railcar lighting and air-conditioning to fluctuate.

Conventional auxiliary power systems for railcars use batteries and/or mechanical flywheels for operation during the supply gaps. However, due to a requirement of a burst of electrical energy during the power supply gaps, batteries and mechanical flywheels are highly inefficient and fall short of desired levels of power density required. Mechanical flywheels further have a problem of low reliability because of highly intensive mechanical shocks experienced during their operation on a railcar, causing them to be replaced more frequently. Batteries further have a problem of low cycle life when charged and discharged rapidly, causing them to be replaced more frequently. Some conventional auxiliary power systems may use an active gap supply unit using transistors and other active components. Unfortunately, these active components inherently create electrical noise and interfere with other electronics (e.g., communication equipment) on the railcar, and/or track signaling circuits. Further, conventional systems that use high power density supply modules are restricted to using those modules to only power a traction/propulsion system through the main power unit. Unfortunately, such conventional systems do not power the auxiliary power unit using the high power density supply modules, and suffer from the deficiencies discussed above.

Exemplary embodiments of the present invention are directed to overcoming the above-noted and other deficiencies in the conventional art.

SUMMARY

According to one aspect of the invention, an auxiliary power supply system includes a passive ultra-capacitor buffer module coupled to an auxiliary power unit, the passive ultra-capacitor buffer module configured to supply a current to the auxiliary power unit. The auxiliary power unit is configured to power one or more auxiliary devices of a railcar over one or more gaps in a power rail.

According to another aspect of the invention, a method for making an auxiliary power supply system includes providing a passive ultra-capacitor buffer module, and coupling an auxiliary power unit to the passive ultra-capacitor buffer module for receiving a current supply from the passive ultra-capacitor buffer module. The auxiliary power unit is configured to power one or more auxiliary devices of a railcar over one or more gaps in a power rail.

Various exemplary embodiments are disclosed to advantageously aid, without limitation, the ability to buffer the input power supply of an auxiliary power unit on a railcar during power supply gaps. Embodiments of the present invention provide sufficient energy to buffer the auxiliary power unit thereby allowing the unit to remain operational during power supply gaps. This buffering action reduces wear on components fed from the auxiliary power unit and improves passenger comfort. Additionally, the buffering provides bursts of power during the gaps and makes the power supply from the auxiliary power unit uninterruptible. Various embodiments of the present invention can be retrofit to existing railcars that already have auxiliary power systems that do not have buffering capability.

DETAILED DESCRIPTION OF THE INVENTION

Exemplary embodiments of the present invention are directed toward an auxiliary power supply system that includes a passive ultra-capacitor buffer module and an auxiliary power unit coupled to the passive ultra-capacitor buffer module. The passive ultra-capacitor buffer module is configured to supply a current to the auxiliary power unit. The auxiliary power unit is configured to power one or more auxiliary devices of a railcar over one or more gaps in a power rail.

Figure 1:
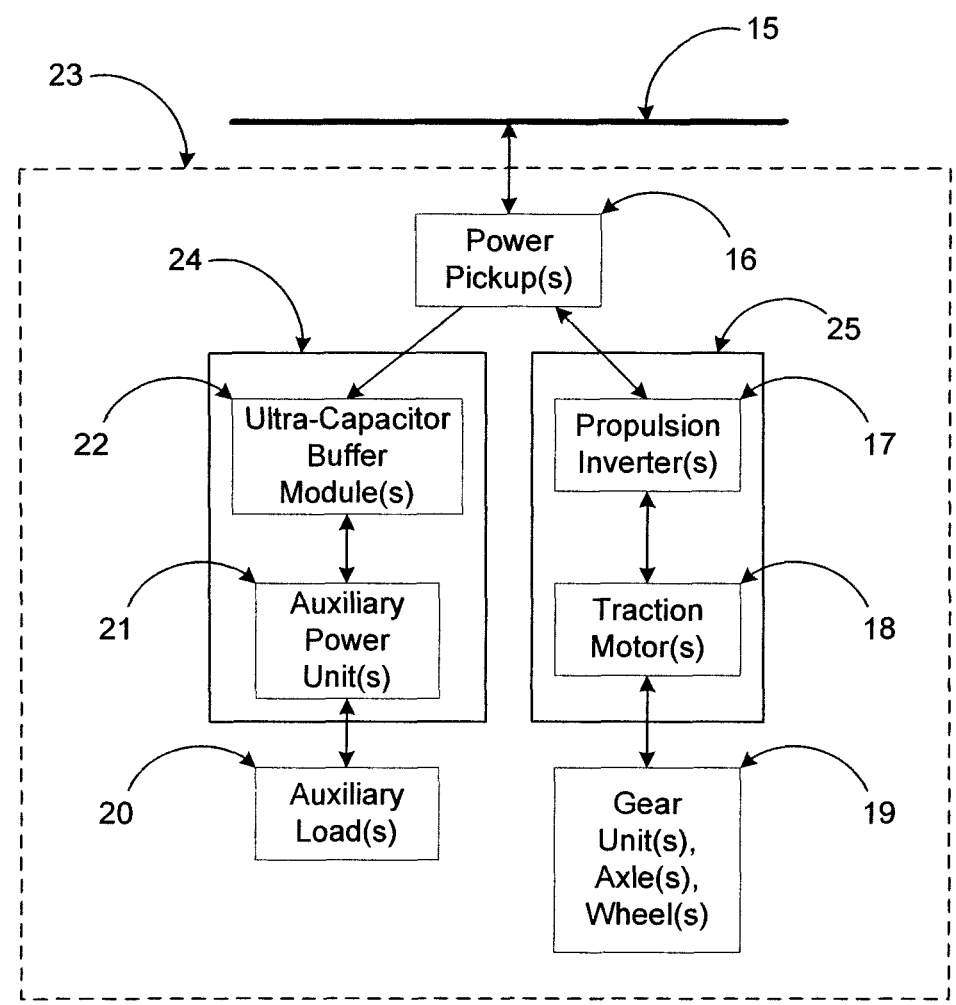
FIG. 1 illustrates an exemplary environment where an auxiliary power system operating in parallel with a main power unit in a railcar, according to one embodiment of the present invention.

Referring to FIG. 1, an exemplary environment where an auxiliary power system 24 operating in parallel with a main power unit 25 in a railcar 23 is illustrated, although auxiliary power system 24 and main power unit 25 may be a part of other types of locomotive systems (e.g., a truck, an airplane, various types of powered vehicles, or other vehicles). It is to be noted that although various elements of FIG. 1 are illustrated inside railcar 23, one or more components (e.g., auxiliary power system 24) may be located outside or below railcar 23 via a releasably attachable interface, as can be contemplated by one of ordinary skill in the art after reading this disclosure. Further, although one railcar 23 is illustrated, embodiments of the present invention may be used in a plurality of railcars similar to railcar 23.

Railcar 23 contains one or more wheels, axles, and gear units 19 that are coupled to and powered by one or more traction motors 18, and are powered by main power unit 25. One or more traction motors 18 are coupled to and powered by one or more propulsion inverters 17, and together one or more traction motors 18 and one or more propulsion inverters 17 are a part of main power unit 25, although main power unit 25 may include additional electrical and/or electro-mechanical components (e.g., mechanical/electronic switches and heat sinks). One or more propulsion inverters 17 are coupled to and receive power from a power rail 15 via coupling through one or more power pickups 16. One or more propulsion inverters 17 may also regenerate power back to power rail 15 through one or more power pickups 16, for example, during a braking operation of railcar 23 over a continuous portion of power rail 15.

In parallel to main power unit 25, railcar 23 includes one or more auxiliary loads 20 driven by one or more auxiliary power units 21 that are a part of auxiliary power system 24. One or more auxiliary loads 20 include auxiliary devices such as lighting systems, air-conditioning, display systems, and communications equipment of railcar 23, for example. One or more auxiliary loads 20 are coupled to and receive power from one or more auxiliary power units 21. One or more auxiliary power units 21 are coupled to and receive power through, and are buffered by, one or more ultra-capacitor buffer modules 22 that are electrically passive devices. One or more ultra-capacitor buffer modules 22 are also interchangeably referred to herein as one or more passive electrochemical double layer capacitor modules 22. One or more ultra-capacitor buffer modules 22 and one or more auxiliary power units 21 are a part of auxiliary power system 24, although auxiliary power system 24 may include additional electrical and/or electro-mechanical components (e.g., input diodes, circuit breakers, mechanical/electronic switches and/or heat sinks), as will be described in detail below with respect to FIGS. 2-4. Additionally, one or more ultra-capacitor buffer modules 22 can be arranged outside railcar 23 as a standalone unit interfaceable with one or more auxiliary power units 21. Such standalone one or more ultra-capacitor buffer modules 22 can be useful, for example, during a maintenance operation of railcar 23, or during retro-fitting and upgrading conventional auxiliary power units to incorporate embodiments of the present invention disclosed herein.

One or more ultra-capacitor buffer modules 22 receive power from power rail 15 via coupling through one or more power pickups 16. One or more ultra-capacitor buffer modules 22 may receive power from one or more auxiliary power units 21 when one or more auxiliary loads 20 have regenerative capability. One or more ultra-capacitor buffer modules 22 may additionally receive power from one or more propulsion inverters 17 depending upon specific design scenarios (e.g., during regenerative braking of railcar 23). In one exemplary embodiment of the present invention, one or more ultra-capacitor buffer modules 22 prevent a flow of power back into the power rail 15 and/or into one or more propulsion inverters 17 of main power unit 25 by a blocking action of a blocking circuitry including one or more input diodes, as will be described in detail below with respect to FIGS. 2-4. The blocking action allows one or more ultra-capacitor buffer modules 22 to buffer only one or more auxiliary power units 21.

Buffering only one or more auxiliary power units 21 of auxiliary power system 24 provides various exemplary advantages. By way of example only, and not by way of limitation, one or more ultra-capacitor buffer modules 22 can be electrically, mechanically, and/or thermally designed or sized to meet the demands of one or more auxiliary power units 21 resulting in a highly customized solution for auxiliary power system 24. Further by way of example only and not by way of limitation, the blocking action ensures that one or more ultra-capacitor buffer modules 22 do not energize a section of power rail 15, while still permitting one or more propulsion inverters 17 to independently regenerate power into power rail 15, thereby increasing overall safety of operation of railcar 23. Furthermore by way of example only and not by way of limitation, blocking current flow from one or more ultra-capacitor buffer modules 22 into one or more propulsion inverters 17 and/or power rail 15 allows a security device (e.g., a fuse) to be included in one or more ultra-capacitor buffer modules 22 that is configured to disconnect one or more ultra-capacitor buffer modules 22 from main power unit 25 in the event that the blocking devices fail with a short circuit failure mode, thereby isolating one or more ultra-capacitor buffer modules 22 from rest of railcar 23.

Figure 2:
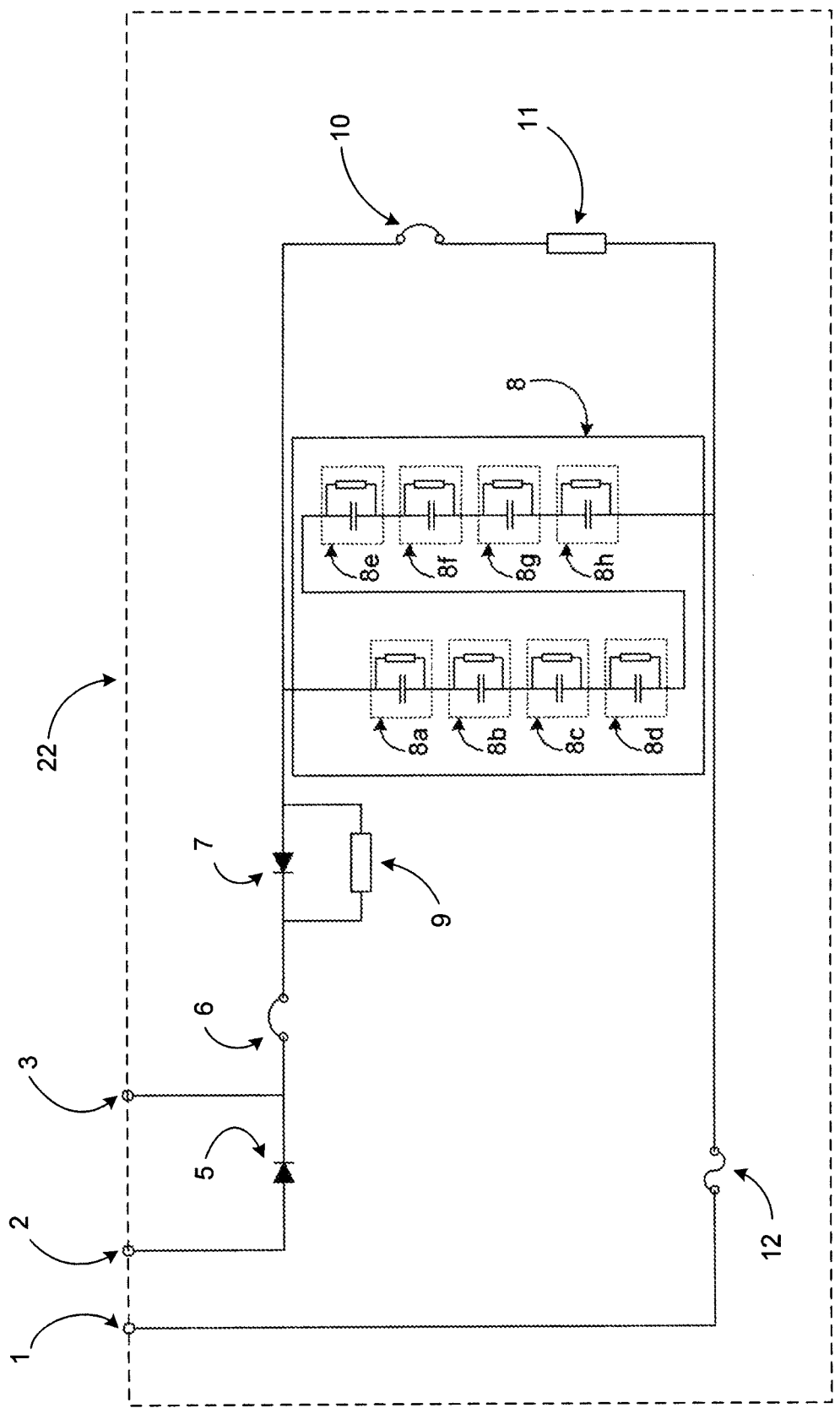
FIG. 2 illustrates a partly functional and partly schematic diagram of the ultra-capacitor buffer module used in the auxiliary power system of FIG. 1.

Referring to FIG. 2, a partly functional and partly schematic diagram of one of one or more ultra-capacitor buffer modules 22 of FIG. 1 is illustrated in more details. In this example, one of one or more ultra-capacitor buffer modules 22 will be interchangeably referred to and described in its singular form as ultra-capacitor buffer module 22, for ease of discussion only, and not as a limitation. Ultra-capacitor buffer module 22 includes three high voltage electrical terminals 1, 2, 3, an input diode 5, an input circuit breaker 6, a supply diode 7, an input current limiting resistor 9, individual ultra-capacitor circuit card assemblies 8a-8h, a discharge circuit breaker 10, and a discharge resistor 11, coupled together in an exemplary arrangement shown in FIG. 2. Ultra-capacitor buffer module 22 also includes a fuse 12 coupled between high voltage electrical terminal 1 and ultra-capacitor circuit card assemblies 8. It is to be noted although one input diode 5, one input circuit breaker 6, one supply diode 7, one input current limiting resistor 9, one discharge circuit breaker 10, and one discharge resistor 11 are shown in FIG. 2, more than one of these components may be used, as may be contemplated by one of ordinary skill in the art after reading this disclosure. Similarly, more or less number of ultra-capacitor circuit card assemblies 8 may be used, as may also be contemplated by one of ordinary skill in the art after reading this disclosure. By way of example only and not by way of limitation, each of individual ultra-capacitor circuit card assemblies 8a-8h is further comprised of ultra-capacitor cells 14 and balancing resistors 13 mounted on a printed circuit board substrate, as will be described in more detail with reference to FIG. 3. By way of example only, and not by way of limitation, there are forty five ultra-capacitor cells 14 and forty five balancing resistors 13, although other numbers of ultra-capacitor cells 14 and balancing resistors 13 could be used. Each of individual ultra-capacitor circuit card assemblies 8a-8h including ultra-capacitor cells 14 can charge during a regenerative braking operation of the propulsion system formed by one or more fraction motors 18 and one or more gear units, axles, and wheels 19 of railcar 23. Alternatively or additionally, each of individual ultra-capacitor circuit card assemblies 8a-8h including ultra-capacitor cells 14 may charge by drawing power during operation of main power unit 25, and/or by drawing current from power rail 15.

Ultra-capacitors (e.g., ultra-capacitor cells 14), also referred to as super-capacitors or electrochemical double layer capacitors, by those of ordinary skill in the art, have a substantially high energy density when compared to common capacitors (e.g., ceramic capacitors), typically on the order of thousands of times greater than a high capacity electrolytic capacitor. For instance, a typical D-cell sized electrolytic capacitor will have a capacitance in the range of tens of milli-farads. The same size ultra-capacitor would have a capacitance of several farads, an improvement of about two or three orders of magnitude in capacitance, but at a lower working voltage. By way of example only, ultra-capacitor cells 14 can be those provided by Ioxus, Inc. of Oneonta, N.Y., USA, although other types of ultra-capacitors manufactured by other vendors may be used.

In one embodiment of the present invention, ultra-capacitor buffer module 22 is included in an enclosure that contains all devices and provides environmental protection. The enclosure can be made of steel or of any other sufficiently rigid and strong material such as high-strength plastic, metal, and the like.

In this example, three high voltage terminals 1, 2, 3 are configured to allow electrical connections to one or more auxiliary power units 21, although other numbers of high voltage terminals could be used, as can be contemplated by one of ordinary skill in the art after reading this disclosure. High voltage terminals 1, 2, 3, referred to as high voltage power return terminal 1, high voltage input terminal 2, and auxiliary supply unit supply terminal 3, respectively, are of sufficient amperage and sufficient insulation for operation at the current and voltage levels of one or more auxiliary power units 21 and power supply from power rail 15. High voltage power return terminal 1 is connected to a high voltage return of the power supply of railcar 23. High voltage input terminal 2 is connected to railcar 23's high voltage power supply. Auxiliary supply unit supply terminal 3 is connected to one or more auxiliary power units 21's high voltage input terminal In this example, input diode 5 in ultra-capacitor buffer module 22 is configured as a part of a current blocking device interposed between one or more auxiliary power units 21 and main power unit 25, the current blocking device configured to block a flow of current from one or more auxiliary power units 21 to main power unit 25 and a propulsion system of the railcar 23 formed by one or more propulsion inverters 17, one or more fraction motors 18, and one or more gear units, axles, and wheels 19. Input diode 5 is configured to block current from flowing back into the power supply from one or more ultra-capacitor circuit card assemblies 8 into main power unit 25. In this example, input diode 5 is of sufficient current and peak-inverse-voltage rating to operate at the current and voltage levels of one or more auxiliary power units 21 and the power supply of power rail 15. In this example, input diode 5 is mounted on a heat sink having sufficient thermal conductivity to dissipate heat generated during operation. As noted above, more than one input diodes similar to input diode 5 can be used, depending upon specific applications.

In this example, input circuit breaker 6 is configured as a part of a security device interposed between and coupled respectively at two opposite terminals to one or more ultra-capacitor circuit card assemblies 8 of ultra-capacitor buffer module 22 and one or more auxiliary power units 21 of auxiliary power system 24 to provide isolation of one or more ultra-capacitor circuit card assemblies 8. Additionally, input circuit breaker 6 opens to clear high voltage faults. By way of example only and not by way of limitation, input circuit breaker 6 is a thermal magnetic type device having a thermal trip point greater than the root-mean-square of the current to be supplied by one or more ultra-capacitor circuit card assemblies 8, although input circuit breaker 6 could be non-magnetic (e.g., an electro-mechanical fuse). Input circuit breaker 6 can have a magnetic trip point less than the short circuit current of one or more ultra-capacitor circuit card assemblies 8, and can be mechanically operated. In one example, input circuit breaker 6 protects input diode 5, which is part of the blocking circuitry that prevents the flow of current from one or more ultra-capacitor buffer modules 22 back out terminal 2 to the propulsion system or to power rail 15. As a result, current from one or more ultra-capacitor buffer modules 22 may only flow out terminal 3 to one or more auxiliary power units 21. If however input diode 5 were to fail in a manner where it was a short circuit, current could flow out terminal 2 to the propulsion system or power rail 15. Such an event is undesirable since it may result in the stored energy in one or more ultra-capacitor buffer modules 22 energizing power rail 15 that was de-energized for some reason, e.g., an emergency evacuation of passengers. By way of example only and not by way of limitation, the propulsion system would typically draw more than 1000 A of current, whereas one or more auxiliary power units 21 can only draw less than 200 A. This significant current difference is taken advantage of by the various examples disclosed herein to allow input circuit breaker 6 to be inserted upstream of one or more ultra-capacitor circuit card assemblies 8. Input circuit breaker 6, in this example, can be configured to not trip at 200 A, but to trip above 200 A. As a result, if current is flowing back into power rail 15 or propulsion system because of a failed blocking device, input circuit breaker 6 automatically trips and disconnects the energy stored in one or more ultra-capacitor buffer modules 22, thereby restoring the safety of the power rail 15 for emergency evacuation of railcar 23, for example.

In this example, supply diode 7 shunts input current limiting resistor 7 when one or more ultra-capacitor circuit card assemblies 8 are supplying current to one or more auxiliary power units 21. Supply diode 7 is of sufficient current and peak-inverse-voltage rating to operate at the current and voltage levels of one or more auxiliary power units 21 and the power supply of power rail 15. Supply diode 7 is interposed between and coupled respectively at two opposite terminals to one or more ultra-capacitor circuit card assemblies 8 and input circuit breaker 6, and is configured to shunt an input current limiting resistor 9, coupled parallel to supply diode 7, when the passive ultra-capacitor buffer module 22 is supplying a current to one or more auxiliary power units 21. In one example, supply diode 7 can be mounted on a heat sink having sufficient thermal conductivity to dissipate heat generated during operation of ultra-capacitor buffer module 22.

In this example, input current limiting resistor 9 is configured to limit the input current during a recovery cycle of one or more ultra-capacitor circuit card assemblies 8 (e.g., during recharging). Input current limiting resistor 9 is a resistor having a resistance value coordinated with a capacitance value of one or more ultra-capacitor circuit card assemblies 8 to allow recovery in sufficient time while the railcar 23 is between one or more power supply gaps.

In this example, discharge circuit breaker 10 is coupled in parallel to one or more ultra-capacitor circuit card assemblies 8 and configured to facilitate a discharge of one or more ultra-capacitor circuit card assemblies 8 prior to a maintenance operation of ultra-capacitor buffer module 22. Discharge circuit breaker 10 connects or disconnects discharge resistor 11. By way of example only, discharge circuit breaker 10 is a thermal magnetic type device, although other numbers and types of devices could be used (e.g., electro-magnetic devices). Discharge circuit breaker 10 can have a thermal trip point greater than the root-mean-square of the current to be discharged through discharge resistor 11, and has a magnetic trip point greater than current discharge at a maximum voltage of one or more ultra-capacitor circuit card assemblies 8 and a minimum resistance of discharge resistor 11. In this example, discharge circuit breaker 10 is mechanically operated, although other methods of operation (e.g., magnetic operation) could be used.

In this example, discharge resistor 11 converts electrical energy in one or more ultra-capacitor circuit card assemblies 8 into heat for discharging. Discharge resistor 11 can be disconnected during regular operation of railcar 23, but is connected to one or more ultra-capacitor circuit card assemblies 8 by discharge circuit breaker 10 during discharge operations. Discharge resistor 11 is of sufficient power rating to completely discharge one or more ultra-capacitor circuit card assemblies 8 when at full charge.

In this example, fuse 12 is an additional security device to clear high voltage faults. Fuse 12 has a clearing current less than a short circuit current of one or more ultra-capacitor circuit card assemblies 8.

In further detail still referring to FIG. 2, there are shown eight individual ultra-capacitor circuit card assemblies 8a-8h forming one or more ultra-capacitor circuit card assemblies 8. Each of eight ultra-capacitor circuit card assemblies 8a-8h are comprised of ultra-capacitor cells and balancing resistors constructed on a printed circuit board substrate as described below in FIG. 3. Although, the ultra-capacitors forming eight ultra-capacitor circuit card assemblies 8a-8h are themselves passive devices, in one embodiment, ultra-capacitor cells may be balanced using active balancing circuitry with insulation from electromagnetic interference, as can be contemplated by one of ordinary skill in the art after reading this disclosure. Each of individual eight ultra-capacitor circuit card assemblies 8a-8h can be connected in a series, parallel or series/parallel fashion such that a total sum of individual voltage ratings exceeds the nominal voltage of the power supply of power rail 15. Each of individual eight ultra-capacitor circuit card assemblies 8a-8h are connected in a series, parallel or series/parallel fashion such that the total sum of the maximum surge voltage rating exceeds the maximum surge voltage of the power supply of power rail 15. Further, although eight ultra-capacitor circuit card assemblies 8a-8h are illustrated in FIG. 2, more or less number of ultra-capacitor circuit card assemblies may be used depending upon specific applications, as will be apparent to those of ordinary skill in the art after reading this disclosure.

Figure 3:
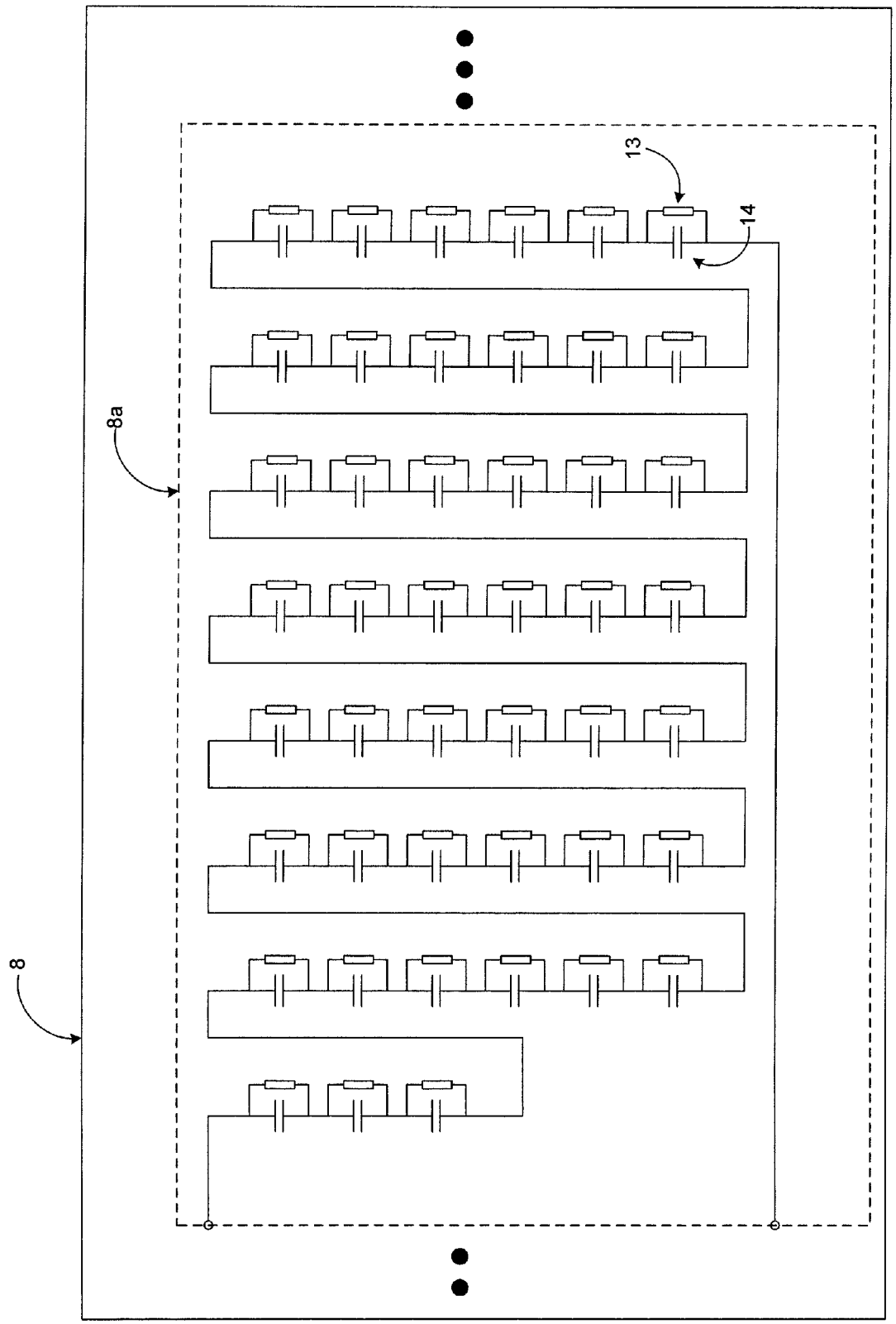
FIG. 3 illustrates an exemplary electrical schematic of an ultra-capacitor circuit card assembly of the ultra-capacitor buffer module of FIG. 2.

Referring to FIG. 3, by way of example only and not by way of limitation, individual ultra-capacitor circuit card assemblies 8a within each one of one or more ultra-capacitor circuit card assemblies 8 is described, although the discussion below is equally applicable to remaining ultra-capacitor circuit card assemblies 8b-8h. In this example, individual ultra-capacitor circuit card assembly 8a comprises forty-five ultra-capacitor cells 14 interconnected in a series, parallel or series/parallel fashion by copper traces on a printed circuit board, although other numbers of these components could be used, as will be apparent to those of ordinary skill in the art after reading this disclosure. In one embodiment of the present invention, one or more of ultra-capacitor cells 14 is a passive ultra-capacitor unit. Each of ultra-capacitor cells 14 have a voltage rating such that the total sum of individual voltage ratings exceeds the nominal power supply voltage of power rail 15. Ultra-capacitor cells 14 have a surge voltage rating such that the total sum of individual surge voltage ratings exceeds the maximum surge voltage of the power supply of power rail 15. Additionally, each of ultra-capacitor cells 14 have a sufficient capacitance to supply energy continuously to one or more auxiliary power units 21 during the power supply gap when discharging from the power supply nominal voltage to the minimum operating voltage of one or more auxiliary power units 21 during the time period of the power supply gap. Further by way of example only, ultra-capacitor cells 14 can have a short circuit current rating exceeding the maximum current for one or more auxiliary power units 21.

Still referring to FIG. 3, there are shown forty-five balancing resistors 13, although other numbers and types of passive balancing components (e.g., inductors) may be used. Balancing resistors 13 are interconnected in series fashion by copper traces on a printed circuit board, although other forms of connection (e.g., on integrated circuits) may be used. Balancing resistors 13 are connected in parallel to each of ultra-capacitor cells 14 having one balancing resistor in parallel to each ultra-capacitor cell. By way of example only and not by way of limitation, balancing resistors 13 can have a resistance value between one-tenth and one-fifth a nominal ultra-capacitor cell operating voltage divided by an ultra-capacitor cell leakage current of corresponding ultra-capacitor cells 14. Additionally, balancing resistors 13 can have a power dissipation capability greater than the product of the square of a maximum power supply voltage divided by a resistance value of balancing resistors 13.

Figure 4:
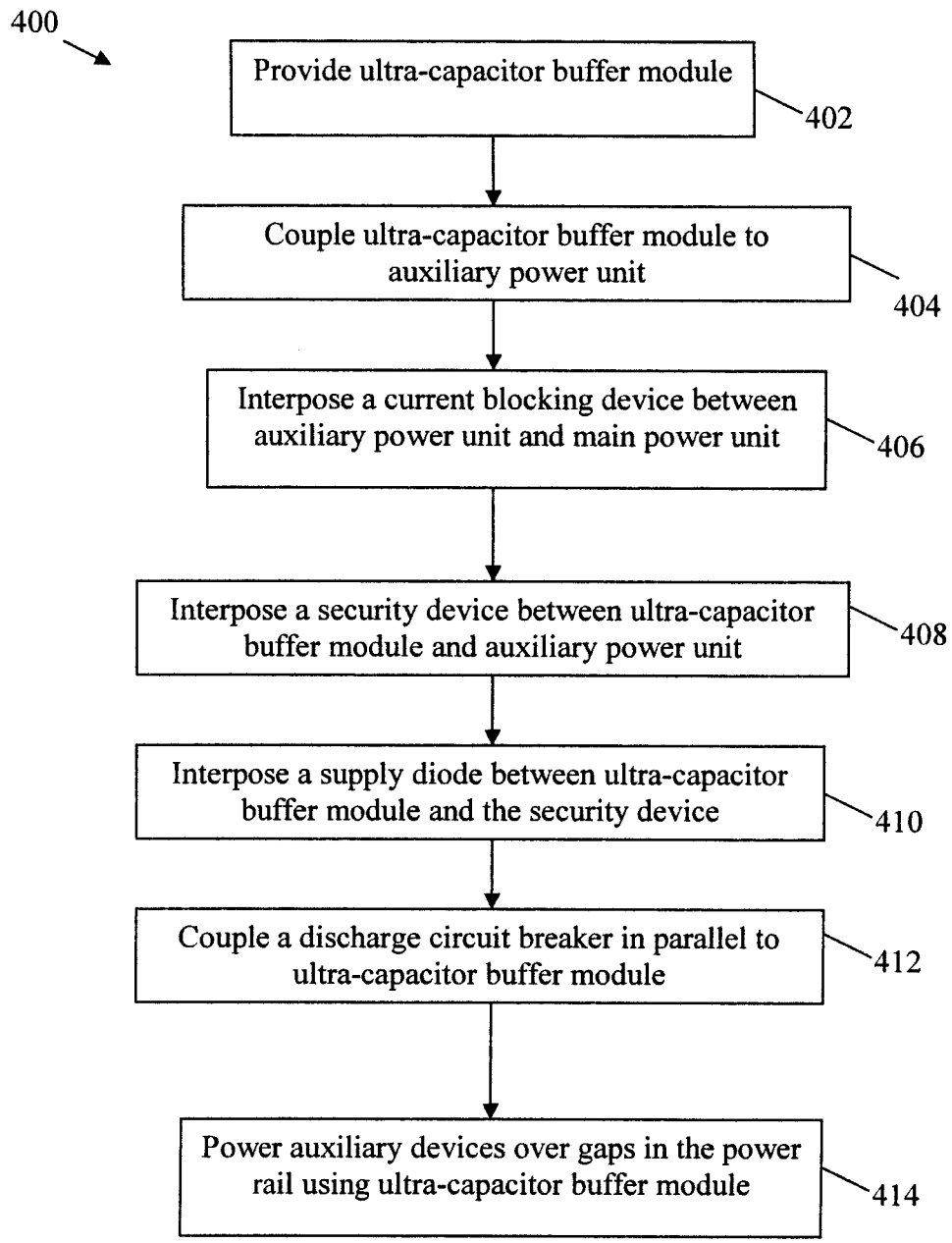
FIG. 4 is a flowchart for an exemplary method of making an auxiliary power system, according to another embodiment of the present invention.

Referring to FIG. 4, a flowchart 400 illustrates an exemplary method of making an auxiliary power system (e.g., auxiliary power system 24), according to another embodiment of the present invention. It is to be noted that steps 402-414 described below can be performed in any order, and the order of steps 402-414 shown in FIG. 4 is by way of example only, and not by way of limitation. Flowchart 400 can be used for making an auxiliary power supply system by providing passive ultra-capacitor buffer module 22, and coupling one or more auxiliary power units 21 to the passive ultra-capacitor buffer module 22 for receiving a current supply from the passive ultra-capacitor buffer module, with one or more auxiliary power units 21 configured to power one or more auxiliary devices (e.g., one or more auxiliary loads 20) of railcar 23 over one or more gaps in power rail 15. Further, one or more steps 402-414 can be implemented using a computer system including computer readable medium with memory for storing instructions, which when executed by one or more processors, enable the processor to perform one or more steps 402-414. Additionally, the computer system can include one or more input output devices and a display for user interaction before, during, or after making auxiliary power system 24, according to various examples disclosed herein.

Flowchart 400 begins at step 402 where one or more ultra-capacitor buffer modules 22 is provided for making auxiliary power system 24, according to an exemplary embodiment of the present invention. As discussed above, one or more ultra-capacitor buffer modules 22 include one or more passive ultra-capacitor circuit card assemblies (e.g., individual ultra-capacitor circuit card assemblies 8a-8h).

In step 404, one or more auxiliary power units 21 is coupled to the one or more ultra-capacitor buffer modules 22 for receiving a current supply from the one or more ultra-capacitor buffer modules 22. One or more auxiliary power units 21 are configured to power one or more auxiliary devices (e.g., one or more auxiliary loads 20) of railcar 23 over one or more gaps in power rail 15. As noted above, these auxiliary devices include, but are not limited to, air-conditioning and lighting systems of railcar 23. In one example, one or more ultra-capacitor buffer modules 22 include ultra-capacitors arranged as ultra-capacitor cells 14 (shown in FIG. 3, by way of example only).

In step 406, a current blocking device (e.g., one or more input diodes 5) is interposed between one or more auxiliary power units 21 and main power unit 25, the current blocking device configured to block a flow of current from one or more auxiliary power units 21 to main power unit 25, and to a propulsion system formed by one or more traction motors 18 and one or more gear units, axles, and wheels 19 of railcar 23.

In step 408, a security device (e.g., input circuit breaker 6) is interposed between and coupled respectively at two opposite terminals to one or more ultra-capacitor circuit card assemblies 8 of one or more ultra-capacitor buffer modules 22 and one or more auxiliary power units 21, the security device configured to provide electrical isolation to one or more passive ultra-capacitor circuit card assemblies 8.

In step 410, supply diode 7 is interposed between and coupled respectively at two opposite terminals to one or more ultra-capacitor circuit card assemblies 8 of one or more ultra-capacitor buffer modules 22 and the security device (e.g., input circuit breaker 6). Supply diode 7 is configured to shunt input current limiting resistor 9, coupled parallel to supply diode 7, when one or more ultra-capacitor circuit card assemblies 8 is supplying a current to one or more auxiliary power units 21.

In step 412, discharge circuit breaker 10 is coupled in parallel to one or more ultra-capacitor circuit card assemblies 8 and is configured to facilitate a discharge of the passive ultra-capacitor circuit card assemblies 8 prior to a maintenance operation of auxiliary power unit 24. Alternatively, by way of example only and not by way of limitation, discharge circuit breaker 10 can be coupled to one or more ultra-capacitor circuit card assemblies 8 at other instances of time (e.g., during manufacturing of one or more ultra-capacitor circuit card assemblies 8).

In step 414, auxiliary devices in railcar 23 are powered by auxiliary power system 24 using one or more ultra-capacitor buffer modules 22 including one or more ultra-capacitor circuit card assemblies 8, while at the same time preventing any reverse flow or leakage of current into main power unit 25 and/or power rail 15.

Accordingly, numerous advantages are realized by the present invention including, by way of example only and without limitation, the ability to buffer the input power supply of one or more auxiliary power units 21 attached to, inside, on, or below railcar 23 during power supply gaps using passive ultra-capacitor buffer module (e.g., one or more ultra-capacitor buffer modules 22). The present invention provides sufficient energy to buffer auxiliary power system 24 safely without current leakage back into main power unit 25, thereby allowing auxiliary power devices of railcar 23 to remain operational during power supply gaps of power rail 15. This buffering action reduces wear on components fed from auxiliary power unit 24 and also improves passenger comfort by maintaining an uninterruptible power supply to railcar 23.

Since other modifications and changes varied to fit particular operating requirements and environments (e.g., powering auxiliary devices of an aircraft) will be apparent to those of ordinary skill in the art after reading this disclosure, embodiments of the present invention are not to be considered limited to the examples chosen for purposes of this disclosure, and cover all changes and modifications which do not constitute departures from the true spirit and scope of the present invention.

Having thus described the basic concept of the present invention, it will be apparent to those of ordinary skill in the art that the foregoing detailed disclosure is intended to be presented by way of example only, and is not limiting. Various alterations, improvements, and modifications will occur and are intended to those of ordinary skill in the art, though not expressly stated herein. These alterations, improvements, and modifications are intended to be suggested hereby, and are within the spirit and scope of the present invention. Two or more components of auxiliary power system 24 can be integrated, or may be made parts of an integrated circuit chip and fabricated accordingly. Further, alterations in electrical and mechanical components may be realized by interchanging and/or adding electrical connections and components for mechanical connections or components and vice-versa, as and when appropriate without departing from the scope of various exemplary aspects of the present invention, as described above. Additionally, the recited order of processing elements or sequences, or the use of numbers, letters, or other designations therefore, is not intended to limit the claimed processes to any particular order, and is exemplary in nature.

What is claimed is:

1. An auxiliary power supply system for a railcar comprising a passive ultra-capacitor buffer module coupled to an auxiliary power unit, the passive ultra-capacitor buffer module configured to receive current from a power rail and to supply a one-way flow of current to the auxiliary power unit, and the auxiliary power unit configured to power one or more auxiliary devices of the railcar in response to the railcar traversing over one or more power supply gaps in the power rail; wherein the auxiliary power unit is unavailable to power the power rail or a propulsion system of the railcar.

2. The auxiliary power supply system of claim 1, wherein the auxiliary power unit operates in parallel to a main power unit configured to power a propulsion system of the railcar over a continuous portion of a power rail.

3. The auxiliary power supply system of claim 2 further comprising:
   a current blocking device interposed between the auxiliary power unit and the main power unit, the current blocking device configured to block a flow of current from the auxiliary power unit to the main power unit and the propulsion system of the railcar.

4. The auxiliary power supply system of claim 3, wherein the current blocking device comprises one or more input diodes.

5. The auxiliary power supply system of claim 2, wherein the passive ultra-capacitor buffer module further charges during at least one of a regenerative braking operation of the propulsion system and an operation of the main power unit.

6. The auxiliary power supply system of claim 1 further comprising:
   a security device interposed between and coupled respectively at two opposite terminals to the passive ultra-capacitor buffer module and the auxiliary power unit, the security device configured to provide electrical isolation to the passive ultra-capacitor buffer module;
   a supply diode interposed between and coupled respectively at two opposite terminals to the passive ultra-capacitor buffer module and the security device, the supply diode configured to shunt an input current limiting resistor, coupled parallel to the supply diode, when the passive ultra-capacitor buffer module is supplying a current to the auxiliary power unit; and
   a discharge circuit breaker coupled in parallel to the passive ultra-capacitor buffer module and configured to facilitate a discharge of the passive ultra-capacitor buffer module prior to a maintenance operation of the auxiliary power unit.

7. The auxiliary power supply system of claim 1, wherein the passive ultra-capacitor buffer module comprises one or more ultra-capacitor cells and balancing resistors.

8. The auxiliary power supply system of claim 7, wherein the one or more ultra-capacitor cells have a voltage rating such that a total sum of individual voltage ratings of each of the one or more ultra-capacitor cells exceeds a nominal voltage rating of the main power unit.

9. The auxiliary power supply system of claim 7, wherein each of the balancing resistors are coupled respectively in parallel to each of the one or more ultra-capacitor cells, wherein at least one of the one or more ultra-capacitor cells is balanced by an active balancing circuit, and wherein the one or more ultra-capacitor cells and balancing resistors are constructed on at least one of a printed circuit board.

10. The auxiliary power supply system of claim 1, wherein the auxiliary power unit is attached to the railcar and the buffer module is a standalone unit interfaceable with the auxiliary power unit.

11. A method for making an auxiliary power supply system for a railcar, the method comprising:
    providing a passive ultra-capacitor buffer module, the passive ultra-capacitor buffer module being configured to receive current from a power rail; and
    coupling an auxiliary power unit to the passive ultra-capacitor buffer module for receiving a one-way flow of current supply from the passive ultra-capacitor buffer module, the auxiliary power unit configured to power one or more auxiliary devices of the railcar in response to the railcar traversing over one or more power supply gaps in the power rail; wherein the auxiliary power unit is unavailable to power the power rail or a propulsion system of the railcar.

12. The method of claim 11, wherein the auxiliary power unit operates in parallel to a main power unit configured to power a propulsion system of the railcar over a continuous portion of a power rail.

13. The method of claim 12 further comprising:
    interposing a current blocking device between the auxiliary power unit and the main power unit, the current blocking device configured to block a flow of current from the auxiliary power unit to the main power unit and the propulsion system of the railcar.

14. The method of claim 13, wherein the current blocking device comprises one or more input diodes.

15. The method of claim 12, wherein the passive ultra-capacitor buffer module further charges during at least one of a regenerative braking operation of the propulsion system and an operation of the main power unit.

16. The method of claim 11 further comprising:
    interposing a security device between and coupled respectively at two opposite terminals to the passive ultra-capacitor buffer module and the auxiliary power unit, the security device configured to provide electrical isolation to the passive ultra-capacitor buffer module;
    interposing a supply diode between and coupled respectively at two opposite terminals to the passive ultra-capacitor buffer module and the security device, the supply diode configured to shunt an input current limiting resistor, coupled parallel to the supply diode, when the passive ultra-capacitor buffer module is supplying a current to the auxiliary power unit; and
    coupling a discharge circuit breaker in parallel to the passive ultra-capacitor buffer module and configured to facilitate a discharge of the passive ultra-capacitor buffer module prior to a maintenance operation of the auxiliary power unit.

17. The method of claim 11, wherein the passive ultra-capacitor buffer module comprises one or more ultra-capacitor cells and balancing resistors.

18. The method of claim 17, wherein the one or more ultra-capacitor cells have a voltage rating such that a total sum of individual voltage ratings of each of the one or more ultra-capacitor cells exceeds a nominal voltage rating of the main power unit.

19. The method of claim 17, wherein each of the balancing resistors are coupled respectively in parallel to each of the one or more ultra-capacitor cells, wherein at least one of the one or more ultra-capacitor cells is balanced by an active balancing circuit, and wherein the one or more ultra-capacitor cells and balancing resistors are constructed on at least one of a printed circuit board.

20. The method of claim 11, wherein the auxiliary power unit is attached to the railcar and the buffer module is a standalone unit interfaceable with the auxiliary power unit.

* * * * *